(12) United States Patent
Creamer et al.

(10) Patent No.: US 8,249,224 B2
(45) Date of Patent: *Aug. 21, 2012

(54) PROVIDING SPEAKER IDENTIFYING INFORMATION WITHIN EMBEDDED DIGITAL INFORMATION

(75) Inventors: Thomas E. Creamer, Boca Raton, FL (US); Peeyush Jaiswal, Boca Raton, FL (US); Victor S. Moore, Lake City, FL (US)

(73) Assignee: International Business Machines Corporation, Armonk, NY (US)

(*) Notice: Subject to any disclaimer, the term of this patent is extended or adjusted under 35 U.S.C. 154(b) by 905 days.

This patent is subject to a terminal disclaimer.

(21) Appl. No.: 12/264,119

(22) Filed: Nov. 3, 2008

(65) Prior Publication Data

US 2009/0052634 A1 Feb. 26, 2009

Related U.S. Application Data

(63) Continuation of application No. 10/736,258, filed on Dec. 15, 2003, now Pat. No. 7,474,739.

(51) Int. Cl.
*H04M 1/64* (2006.01)
*G10L 19/00* (2006.01)
*G07C 9/00* (2006.01)

(52) U.S. Cl. ............... 379/88.01; 340/5.86; 340/573.1; 370/230.1; 370/352; 370/401; 370/476; 379/38; 379/88.02; 379/142.14; 379/387.01; 455/563; 463/9; 704/3; 704/205; 704/228; 704/246; 704/275; 705/7.13; 705/7.14; 705/325; 709/201

(58) Field of Classification Search .............. 340/5.86, 340/573.1; 379/38, 88.01, 142.14, 88.02, 379/387.01; 463/9; 704/246, 205, 3, 228, 704/235, 248, 270, 273, 275, 277; 705/7.13, 705/7.14, 325; 370/230.1, 352, 401, 476; 455/563; 469/3; 709/201

See application file for complete search history.

(56) References Cited

U.S. PATENT DOCUMENTS

| | | | |
|---|---|---|---|
| 4,653,097 A | | 3/1987 | Watanabe et al. |
| 5,108,115 A | * | 4/1992 | Berman et al. ............. 463/9 |
| 5,181,238 A | | 1/1993 | Medamana et al. |
| 5,319,735 A | * | 6/1994 | Preuss et al. ............ 704/205 |
| 5,901,284 A | | 5/1999 | Hamdy-Swink |
| 5,955,952 A | * | 9/1999 | Bergman et al. ......... 340/573.1 |
| 5,970,468 A | * | 10/1999 | Bull ..................... 705/7.13 |
| 6,130,620 A | * | 10/2000 | Pinnow et al. ........... 340/5.86 |
| 6,324,271 B1 | | 11/2001 | Sawyer et al. |
| 6,463,127 B1 | * | 10/2002 | Maier et al. .............. 379/38 |
| 6,697,642 B1 | | 2/2004 | Thomas |
| 6,941,269 B1 | * | 9/2005 | Cohen et al. ............ 704/275 |
| 6,954,522 B2 | * | 10/2005 | Creamer et al. ........ 379/142.14 |

(Continued)

FOREIGN PATENT DOCUMENTS

CN 1185854 6/1998

(Continued)

*Primary Examiner* — Gerald Gauthier
(74) *Attorney, Agent, or Firm* — Novak Druce + Quigg LLP

(57) ABSTRACT

A method of providing identifying information over a voice communications link can include receiving, from a call participant, a personal identification code over the voice communications link, determining identifying information for the call participant using the personal identification code, and encoding the identifying information of the call participant within a voice stream carried by the voice communications link. The voice stream and identifying information can be sent to a subscriber.

20 Claims, 1 Drawing Sheet

U.S. PATENT DOCUMENTS

| | | | | |
|---|---|---|---|---|
| 6,965,868 | B1 * | 11/2005 | Bednarek | 705/7.14 |
| 7,042,888 | B2 * | 5/2006 | Berggreen | 370/401 |
| 7,047,203 | B2 * | 5/2006 | Johnson | 705/325 |
| 7,088,739 | B2 * | 8/2006 | DeMars et al. | 370/476 |
| 7,180,997 | B2 * | 2/2007 | Knappe | 379/387.01 |
| 7,299,176 | B1 * | 11/2007 | Lee et al. | 704/228 |
| 7,406,414 | B2 * | 7/2008 | Creamer et al. | 704/235 |
| 7,474,739 | B2 * | 1/2009 | Creamer et al. | 379/88.01 |
| 7,835,280 | B2 * | 11/2010 | Pang et al. | 370/230.1 |
| 8,027,842 | B2 * | 9/2011 | Creamer et al. | 704/273 |
| 2002/0076021 | A1 | 6/2002 | Lopez et al. | |
| 2002/0193999 | A1 * | 12/2002 | Keane et al. | 704/270 |
| 2003/0063717 | A1 | 4/2003 | Holmes | |
| 2003/0081781 | A1 | 5/2003 | Jensen et al. | |
| 2003/0105799 | A1 * | 6/2003 | Khan et al. | 709/201 |
| 2003/0154073 | A1 | 8/2003 | Ota et al. | |
| 2003/0158730 | A1 | 8/2003 | Ota et al. | |
| 2005/0129189 | A1 * | 6/2005 | Creamer et al. | 379/88.02 |
| 2005/0131690 | A1 * | 6/2005 | Creamer et al. | 704/246 |
| 2005/0131709 | A1 * | 6/2005 | Creamer et al. | 704/277 |
| 2008/0255825 | A1 * | 10/2008 | Creamer et al. | 704/3 |
| 2009/0052634 | A1 * | 2/2009 | Creamer et al. | 379/88.01 |
| 2009/0080623 | A1 * | 3/2009 | Creamer et al. | 379/88.02 |

FOREIGN PATENT DOCUMENTS

| | | |
|---|---|---|
| CN | 1369169 | 9/2002 |
| CN | 1402565 | 3/2003 |
| WO | WO 91/07041 | 5/1991 |

* cited by examiner

PROVIDING SPEAKER IDENTIFYING INFORMATION WITHIN EMBEDDED DIGITAL INFORMATION

CROSS REFERENCE TO RELATED APPLICATIONS

This application is a continuation of, and accordingly claims the benefit of, U.S. patent application Ser. No. 10/736,258, filed with the U.S. Patent and Trademark Office on Dec. 15, 2003, now U.S. Pat. No. 7,474,739.

BACKGROUND

1. Field of the Invention

The invention relates to speaker identification over a communications channel.

2. Description of the Related Art

Conventional calling line identification (CLID) and the associated display terminals have become commonplace in the market. Known CLID services deliver the directory number, subscriber name or business name associated with the calling telephone line rather than the true identity of the caller. Human recognition of the caller, if known to the called party, must be relied on for verifying a caller's identity. The value of human recognition, however, is limited by the fact that the caller may not be known to the called party. Thus known CLID services fail to provide an assured identity of the caller that can be acted on reliably.

Consequently, the CLID cannot be acted on with certainty since the same CLID is delivered regardless of who actually places the call. For example, when all members of a household share the same CLID associated with a subscriber number, the displayed name and number does not identify which of the several family members is making the call. If a call is placed by an individual away from their customary phone as would occur for a business traveler at a payphone, hotel room, or colleague's desk, the caller's personal identity is not delivered.

CLID information is transmitted on the subscriber loop using frequency shift keyed (FSK) modem tones. These FSK modem tones are used to transmit the display message in American Standard Code for Information Interchange (ASCII) character code form. The transmission of the display message takes place between the first and second ring. Hence, the CLID data is not sent once the call is established.

As such, the aforementioned problems with CLID are further exacerbated within the context of conference calls. With respect to conference calls, once each participant is connected, it can be difficult for a listener to discern the identity of a speaking party. This may result from the listener's unfamiliarity with the speaker or that several of the conference call participants sound alike. Because CLID is transmitted prior to the telephone call, CLID is not well suited to address this problem.

SUMMARY OF THE INVENTION

The present invention provides a method, system, and apparatus for providing identifying information as well as authentication information to a subscriber. In particular, a call participant, whether prior to a telephone call being established or during a telephone call, can provide some sort of identifier or code. That code can be used to verify the identity of the call participant, or authenticate the call participant. Information specifying whether the person was authenticated can be provided to a subscriber.

One aspect of the present invention can include a method of providing identifying information over a voice communications link. The method can include receiving, from a call participant, a personal identification code over the voice communications link, determining identifying information for the call participant using the personal identification code, and encoding the identifying information of the call participant within a voice stream carried by the voice communications link. Accordingly, the voice stream and identifying information can be sent to a subscriber.

In one embodiment of the present invention, the voice communications link can be a telephony communications link. The identifying information can indicate whether the call participant has been authenticated. The identifying information and the voice stream can be digital information, such that the identifying information is embedded within the voice stream. For example, the encoding step can include removing inaudible portions a speech signal and embedding the identifying information in place of the inaudible portions of the speech signal within the voice stream.

The method also can include receiving the voice stream and identifying information and decoding the identifying information. A representation of the identifying information can be presented, for example to the subscriber. An audible representation of the voice stream also can be played. In one embodiment, the audible representation of the received voice stream can be played substantially concurrently with the presentation of the identifying information.

Other embodiments of the present invention can include a system having means for performing the various steps disclosed herein and a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
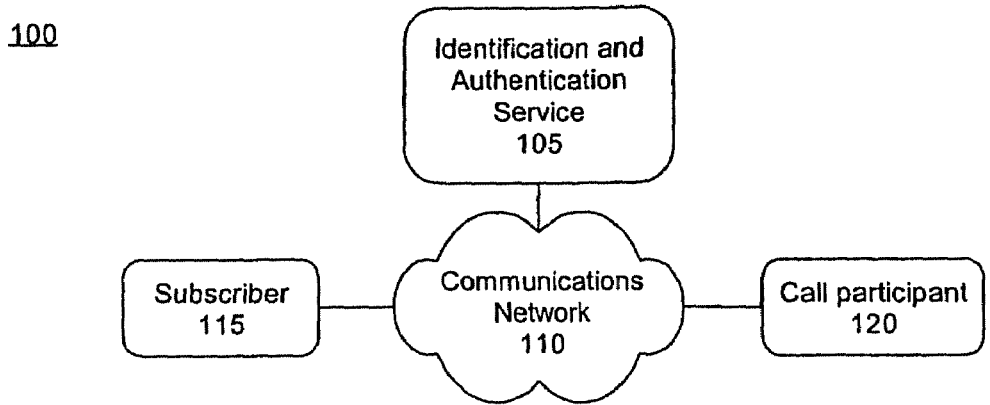
FIG. 1 is a schematic diagram illustrating a system for providing speaker identifying information within embedded digital information in accordance with the inventive arrangements disclosed herein.

FIG. 1 is a schematic diagram illustrating a system 100 for providing speaker identifying information within embedded digital information in accordance with the inventive arrangements disclosed herein. As shown, the system 100 can include an Identification and Authentication Service (IAS) 105 and a communications network 110 over which a subscriber 115 and a call participant 120 can communicate. The communications network can include, but is not limited to, the Internet, a wide area network, a local area network, an intranet, and/or the Public Switched Telephone Network.

The IAS 105 can be implemented as a computer program executing within an information processing system. For example, in one embodiment, the IAS 105 can execute within a computer system such as a server that is communicatively linked to a telephony switching system via a suitable gateway interface. In that case, the IAS 105 can be located on premises with the telephony switching system or remote from such a switching system. In another embodiment, the IAS 105 can execute within the telephony switch itself.

The IAS 105 can be configured to join in telephone calls, either prior to the establishment of the telephone call or during the call, to authenticate a call participant 120. A subscriber 115 to the IAS 105 can selectively engage the IAS 105 to authenticate calling parties, such as call participant 120. For example, the IAS 105 can be invoked for particular calls to the subscriber 115. Determinations as to when the IAS 105 is to be invoked can be based upon rules defined by the subscriber 115 which specify dates and times, such as after 9:00 p.m., on national holidays, based upon whether the calling number is recognized, or a combination thereof. Still, the IAS 105 can be invoked for all calls to the subscriber 115, or can be invoked by the subscriber 115 as desired to verify any call participant whether the call participant initiated the call or not.

The IAS 105 can receive identifying information from a call participant 120 and compare that information with stored authentication data. The authentication data can be stored within the IAS 105 or can be stored in a remote data store that is communicatively linked with the IAS 105. In any case, based upon a comparison of identifying information provided by the call participant 120 with stored authentication information, the IAS 105 can authenticate the call participant 120 to determine whether the call participant 120 is who that person portends to be.

The IAS 105 can encode the identifying information using any of a variety of different mechanisms. For example, in one aspect, the IAS 105 can be implemented as a perceptual audio processor, similar to a perceptual codec, to analyze a received voice signal. A perceptual codec is a mathematical description of the limitations of the human auditory system and, therefore, human auditory perception. Examples of perceptual codecs can include, but are not limited to MPEG Layer-3 codecs and MPEG Layer-4 codecs. The IAS 105 is substantially similar to the perceptual codec with the noted exception that the IAS 105 can, but need not implement, a second stage of compression as is typical with perceptual codecs.

The IAS 105, similar to a perceptual codec, can include a psychoacoustic model to which source material, in this case a voice signal from a call participant or speaker, can be compared. By comparing the voice signal with the stored psychoacoustic model, the perceptual codec identifies portions of the voice signal that are not likely, or are less likely to be perceived by a listener. These portions are referred to as being inaudible. Typically a perceptual codec removes such portions of the source material prior to encoding, as can the IAS 105. The IAS 105, however, can add the identifying information in place of the removed source material, i.e. the inaudible portions of speech.

Still, those skilled in the art will recognize that the present invention can utilize any suitable means or techniques for encoding identifying information and embedding such digital information within a digital voice stream. As such, the present invention is not limited to the use of one particular encoding scheme.

Figure 2:
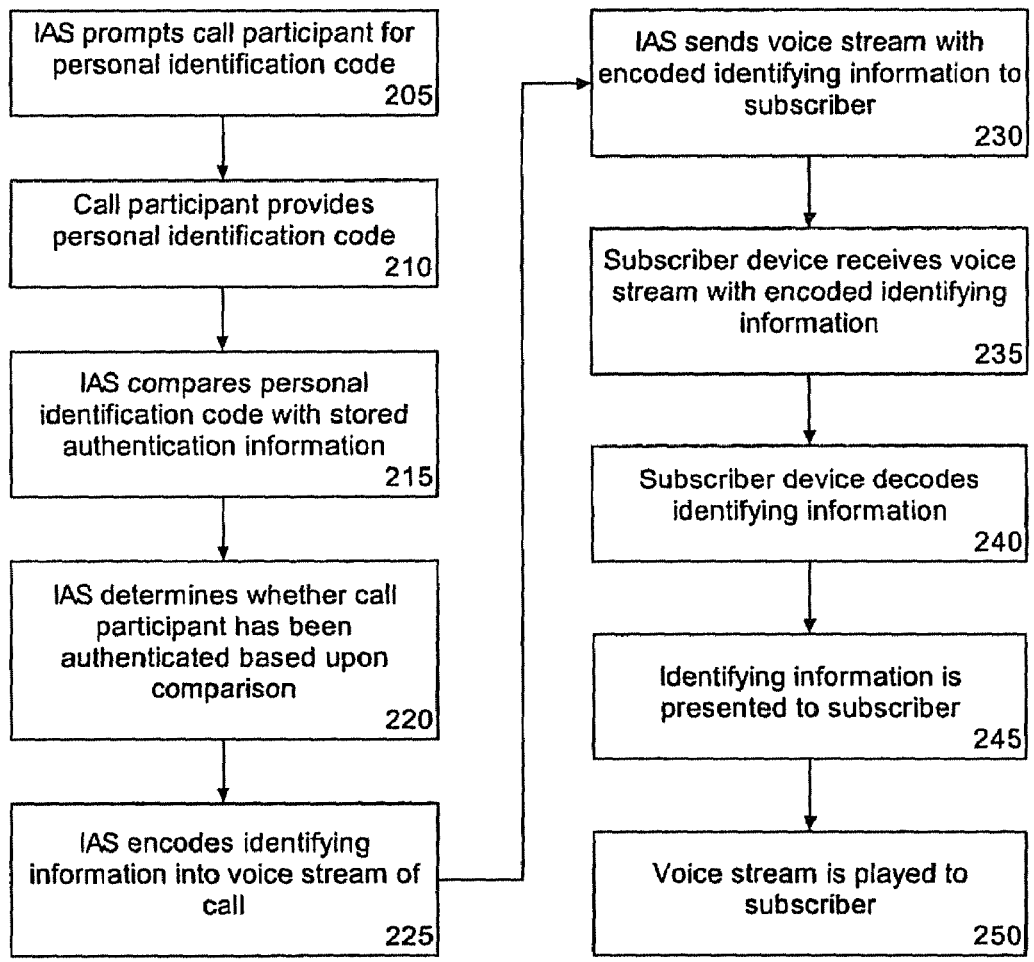
FIG. 2 is a flow chart illustrating a method of providing speaker identifying information within embedded digital information in accordance with the inventive arrangements disclosed herein.

FIG. 2 is a flow chart illustrating a method 200 of providing speaker identifying information within embedded digital information in accordance with the inventive arrangements disclosed herein. The method 200 can begin in a state where a call participant is attempting to place a telephone call to a subscriber or a state where a telephone call has been established between a call participant and a subscriber. The telephone call can be a conventional landline telephone call, a wireless or mobile telephone call, or a Voice-Over Internet Protocol (VOIP) telephone call.

In step 205, the IAS can prompt the call participant for a personal identification code. The call participant can provide a personal identification code in step 210. The personal identification code can be provided as a series of one or more dual tone multi-frequency (DTMF) tones or as speech. Accordingly, the IAS can interpret the received personal identification code, whether by identifying the keys that were activated in the case of a DTMF input, or by recognizing user speech to determine a text equivalent of the received input.

In step 215, the IAS compares the received personal identification code with stored authentication information. In one embodiment, the IAS can determine a set of authentication information to which the received personal identification code is to be compared by determining the telephone number corresponding to the communications link over which the call participant has provided the personal identification code. For example, each telephone number can be associated with one or more user profiles. Each user profile can be associated with one of several family members or other likely users of the telephone line or number and each specifying a unique personal identification code. In another embodiment, the IAS can first query the call participant for an identifier. The identifier can be used to locate stored authentication information. In any case, having located authentication information for the call participant, the IAS can compare the received personal identification code with a personal identification code stored within the authentication information.

In step 220, the IAS determines whether the call participant has been authenticated based upon the comparison. More particularly, if the received personal identification code matches the code stored within the authentication data, the call participant has been successfully authenticated. In other words, an identity of the call participant has been established and verified. Notably, the identity of the call participant may not be the name associated with the line or telephone number over which that call participant is communicating.

In step 225, the IAS can encode identifying information for the call participant within a voice stream. That is, the identifying information, in digital form, can be embedded within the digital voice stream of the telephone call, resulting in a voice signal having embedded digital identifying information for the speaker. In one embodiment, the identifying information can specify the identity of the speaker. For example, the identifying information can specify the speaker or call participant's name, an address, a contact telephone number, or any other identifying information, which may or may not correspond to the line from which the call participant is calling. In another embodiment, the identifying information can indicate whether the calling participant was successfully authenticated or verified.

More particularly, the identifying information can be sent to the subscriber as an encoded stream of digital information that is embedded within the digital voice stream. The IAS can identify which portions of the received audio signal are inaudible, for example using a psychoacoustic model. For instance, humans tend to have sensitive hearing between approximately 2 kHz and 4 kHz. The human voice occupies the frequency range of approximately 500 Hz to 2 kHz. As such, the IAS can remove portions of a voice signal, for example those portions below approximately 500 Hz and above approximately 2 kHz, without rendering the resulting voice signal unintelligible. This leaves sufficient bandwidth within a telephony signal within which the identifying information can be encoded and sent within the digital voice stream.

The IAS further can detect sounds that are effectively masked or made inaudible by other sounds. For example, the IAS can identify cases of auditory masking where portions of the voice signal are masked by other portions of the voice signal as a result of perceived loudness, and/or temporal masking where portions of the voice signal are masked due to the timing of sounds within the voice signal.

It should be appreciated that as determinations regarding which portions of a voice signal are inaudible are based upon a psychoacoustic model, some users will be able to detect a difference should those portions be removed from the voice signal. In any case, inaudible portions of a signal can include those portions of a voice signal as determined from the IAS that, if removed, will not render the voice signal unintelligible or prevent a listener from understanding the content of the voice signal. Accordingly, the various frequency ranges disclosed herein are offered as examples only and are not intended as limitations of the present invention.

The IAS can remove the identified portions, i.e. those identified as inaudible, from the voice signal and add the identifying information in place of the removed portions of the voice signal. That is, the IAS replaces the inaudible portions of the voice signal with digital identifying information. As noted, the identifying information can include, but is not limited to, voice levels, stress levels, voice inflections, and/or emotional states as may be determined from a speaker's voice.

In step 230, the IAS sends the voice stream with the encoded and embedded identifying information to a receiving device of the subscriber. In step 235, the subscriber device receives the voice stream with the encoded identifying information and, in step 240, decodes the identifying information. In step 245, the receiving device can present the identifying information. For example, the identifying information can be presented visually or can be played audibly, for instance through a text-to-speech system. In step 250, the voice stream can be played audibly. In one embodiment of the present invention, the presentation of the identifying information and the playing of the voice stream can occur substantially simultaneously.

The inventive arrangements disclosed herein have been presented for purposes of illustration only. As such, neither the examples presented nor the ordering of the steps disclosed herein should be construed as a limitation of the present invention. For example, as noted, the present invention can be invoked prior to a telephone call or during a telephone call. The call participant also can be prompted for additional information as may be required to locate stored authentication data and perform identity verification.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for providing identifying information over a voice communications link comprising:
   means for receiving, from a call participant, a personal identification code over the voice communications link;
   means for determining identifying information for the call participant using the personal identification code;
   means for encoding the identifying information of the call participant within a voice stream carried by the voice communications link; and
   means for sending the voice stream and identifying information to a subscriber.

2. The system of claim 1, wherein the voice communications link is a telephony communications link.

3. The system of claim 1, wherein the identifying information indicates whether the call participant has been authenticated.

4. The system of claim 1, wherein the identifying information and the voice stream are digital information, such that the identifying information is embedded within the voice stream.

5. The system of claim 4, said means for encoding comprising:
   means for removing inaudible portions a speech signal; and
   means for embedding the identifying information in place of the inaudible portions of the speech signal within the voice stream.

6. The system of claim 1, further comprising:
   means for receiving the voice stream and identifying information; and
   means for decoding the identifying information.

7. The system of claim 6, further comprising means for presenting a representation of the identifying information.

8. The system of claim 7, further comprising means for playing an audible representation of the voice stream.

9. The system of claim 8, wherein the audible representation of the received voice stream is played substantially concurrently with the presentation of the identifying information.

10. The system of claim 1, wherein the process of providing identification information is performed by an identification and authentication service, which is invoked based upon rules defined by the subscriber or as desired by the subscriber.

11. A machine readable storage, having stored thereon a computer program having a plurality of code sections executable by a machine for causing the machine to perform the steps of:

receiving, from a call participant, a personal identification code over the voice communications link;

determining identifying information for the call participant using the personal identification code;

encoding the identifying information of the call participant within a voice stream carried by the voice communications link; and sending the voice stream and identifying information to a subscriber.

12. The machine readable storage of claim 11, wherein the voice communications link is a telephony communications link.

13. The machine readable storage of claim 11, wherein the identifying information indicates whether the call participant has been authenticated.

14. The machine readable storage of claim 11, wherein the identifying information and the voice stream are digital information, such that the identifying information is embedded within the voice stream.

15. The machine readable storage of claim 14, said encoding step comprising:

removing inaudible portions a speech signal; and embedding the identifying information in place of the inaudible portions of the speech signal within the voice stream.

16. The machine readable storage of claim 12, further comprising:

receiving the voice stream and identifying information; and decoding the identifying information.

17. The machine readable storage of claim 16, further comprising presenting a representation of the identifying information.

18. The machine readable storage of claim 17, further comprising playing an audible representation of the voice stream.

19. The machine readable storage of claim 18, wherein the audible representation of the received voice stream is played substantially concurrently with the presentation of the identifying information.

20. The machine readable storage of claim 11, wherein the process of providing identification information is invoked based upon rules defined by the subscriber or as desired by the subscriber.

* * * * *